United States Patent

[11] 3,576,453

[72] Inventor Warren P. Mason
West Orange, N.J.
[21] Appl. No. 821,273
[22] Filed May 2, 1969
[45] Patented Apr. 27, 1971
[73] Assignee Bell Telephone Laboratories, Incorporated
Murray Hill, Berkeley Heights, N.J.

[54] MONOLITHIC ELECTRIC WAVE FILTERS
8 Claims, 8 Drawing Figs.

[52] U.S. Cl. .......... 310/8.2,
310/9.5, 310/9.6, 310/9.8, 333/72
[51] Int. Cl. .......... H01v 7/00
[50] Field of Search .......... 310/8, 8.1,
8.2, 9.5—9.8; 333/72

[56] References Cited
UNITED STATES PATENTS

| | | | |
|---|---|---|---|
| 2,161,980 | 6/1939 | Runge et al. | 310/9.6X |
| 2,301,269 | 11/1942 | Gerber | 310/9.6X |
| 3,059,130 | 10/1962 | Robins | 310/9.6 |
| 3,334,307 | 8/1967 | Blum | 333/72X |
| 3,384,768 | 5/1968 | Shockley et al. | 310/9.5 |

*Primary Examiner*—M. O. Hershfield
*Assistant Examiner*—Mark O. Budd
*Attorneys*—R. J. Guenther and Edwin B. Cave

ABSTRACT: A crystal wafer supports two or more pairs of opposing electrodes to form a monolithic crystal filter. The wafer material has a high piezoelectric coupling coefficient. Inharmonic oscillations are suppressed by plating the electrodes on the surfaces of recesses in the faces of the wafer.

Patented April 27, 1971 3,576,453

2 Sheets-Sheet 1

INVENTOR
W. P. MASON
BY Leo Stanger
ATTORNEY

MONOLITHIC ELECTRIC WAVE FILTERS

REFERENCES TO COPENDING APPLICATIONS

This application relates to the following copending applications, the subject matters of which are herewith incorporated as part of this application as if recited herein:

W. D. Beaver and R. A. Sykes, Ser. No. 541,549 filed Apr. 11, 1966;

W. D. Beaver and R. A. Sykes, Ser. No. 558,338 filed June 17, 1966;

R. L. Reynolds and R. A. Sykes, Ser. No. 726,676 filed Apr. 24, 1968;

I. E. Fair and E. C. Thompson, Ser. No. 771,843 filed Oct. 30, 1968;

Rennick-Smith, Case 1—5, Ser. No. 797,837 filed Feb. 10, 1969.

Each of these applications is assigned to the same assignee as that of this application.

BACKGROUND OF THE INVENTION

This invention relates to energy transfer devices and particularly to crystal filters wherein a crystal wafer forms a plurality of acoustically coupled resonators to establish a given passband.

According to the beforementioned applications, low-loss transmission of energy through a piezoelectrically resonant crystal wafer vibrating in the thickness shear mode is selectively controlled by covering the opposite faces of the wafer with a number of spaced electrode pairs whose masses are sufficient to concentrate the thickness shear vibrations between the electrodes of each pair so that the pairs form separate resonators with the wafer, and by spacing the pairs far enough so that the coupling between any two adjacent resonators is less than a threshold value. According to the beforementioned applications, these capabilities are exploited in the form of a filter. The filter controls the passband between an electric source connected to one resonator so as to excite thickness shear vibrations in the wafer, and a resistive load connected across another pair of electrodes. The passband at the load is predetermined by varying the electrode masses and the spacing between the electrodes to achieve desired couplings.

When the wafer material has a low piezoelectric coupling coefficient such as that of quartz, these filters furnish smooth passbands of limited bandwidth. Wider bandwidths are available from filters using materials such as $LiTO_3$ of higher piezoelectric couplings. However, the high coupling coefficients cause the electrodes to emphasize inharmonic modes of thickness shear vibrations. This is so because the amount of energy trapping, that is to say, the tendency to concentrate the vibrations in the vicinity of the electrodes, and to detune the wafer near the electrodes is quite pronounced so that even lightly electroded wafer exhibit significant energy trapping. Also, even light electroding causes the resonator formed by the electrodes and the wafer to be widely detuned from the fundamental thickness shear frequency of the wafer.

It has been proposed that reducing the sizes of the electrodes in a multipair filter, particularly along the axis transverse to the separation between the electrode pairs, reduces the effects of inharmonic modes. This expedient is suitable for operation in some circumstances. However, filters operating in the third or higher harmonics at frequencies of 30 MHz. and above, then require electrodes that are minute. This creates manufacturing problems.

THE INVENTION

According to a feature of the invention, these deficiencies of filters formed from electrode pairs mounted on a single wafer so as to produce a multiplicity of resonators, are obviated by mounting the electrode pairs in recesses formed in the surface of the wafer.

According to a more general aspect of the invention, a single resonator crystal structure is formed without the effects of inharmonic modes by recessing one or both of the opposing electrodes in a suitable depression in a crystal wafer.

These and other features of the invention are pointed out in the claims forming a part of this specification. Other advantages and specifications of the invention will become known from the following detailed description when read in light of the accompanying drawings.

DESCRIPTION OF PREFERRED EMBODIMENTS

Figure 1:
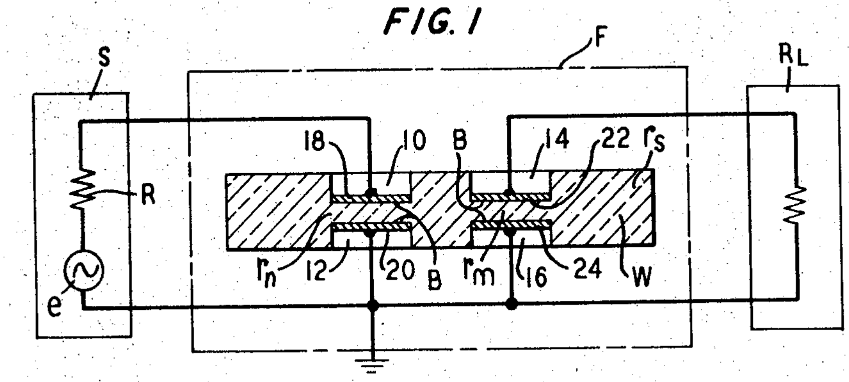
FIG. 1 is a partially schematic drawing of a circuit, with a crystal filter shown sectionally, illustrating an embodiment of the invention.
Figure 2:
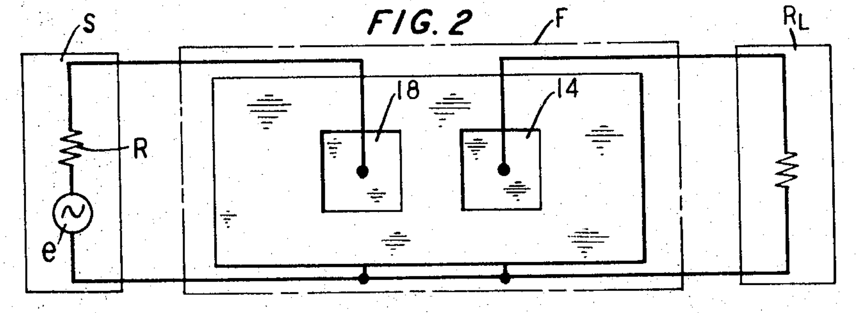
FIG. 2 is a diagram of the circuit of FIG. 1 showing a plan view of the filter in FIG. 1.

In FIGS. 1 and 2 a high frequency energizing source S having a variable frequency voltage $e$ and an internal resistance R energizes a load $R_L$ through a band-pass filter F embodying features of the invention. Forming the filter F is a wafer W composed of a high piezoelectric coupling material such as lithium tantalate, lithium niobate, barium sodium niobate, zinc oxide, or cadmium sulfide. Vapor deposited in the bases B of four rectangular depressions 10, 12, 14, and 16 in the wafer are two pairs of opposing gold electrodes 18 and 20, and 22 and 24. For clarity in FIGS. 1 and 2, as well as the remaining FIGS., the thicknesses of the wafer W, the recesses, and the electrodes are exaggerated.

Through suitable circuitry the source S energizes the electrodes 18 and 20 which then piezoelectrically generate thickness shear vibrations in the wafer W. The vibrations thus appearing at the electrodes 22 and 24 piezoelectrically generate voltages which suitable circuitry applies to the load $R_L$ to energize it over a given frequency band.

The excited wafer W exhibits a fundamental thickness shear frequency $f_W$ which depends upon the wafer thickness in the region $r_s$ surrounding the depressions 10, 12, 14, and 16. The excited narrower wafer regions $r_n$ and $r_m$ between the depressions 10 and 12 and between the depressions 14 and 16, exhibit respective resonant frequencies $f_1$ and $f_2$ when these two regions are effectively uncoupled or decoupled from each other. They then also exhibit respective antiresonant frequencies $f_{a1}$ and $f_{a2}$ higher than $f_1$ and $f_2$.

In FIGS. 1 and 2 the frequencies $f_1$ and $f_2$ are identical. They are a function of the combined wafer and electrode thicknesses, the materials, and the electrical field applied across the wafer. The antiresonant frequencies $f_{a1}$ and $f_{a2}$ are also identical, and functions of the same characteristics as well as the electrostatic capacitances of the electrode pairs 18 and 20, and 22 and 24.

With materials having high piezoelectric coupling such as $LiTaO_3$, $LiNbO_3$, $NaNaNbO_3$, ZnO, CdS, the electric field at the electrodes is so effective in lowering the resonant frequencies $f_1$ and $f_2$ that they are lower than $f_W$ even though the regions $r_n$ and $r_m$ between the electrodes are thinner than the overall wafer thickness. The more the frequencies $f_1$ and $f_2$ differ from $f_W$, and the greater the spacing between the electroded regions, the less the coupling between the resonators formed by them.

In FIGS. 1 and 2 coupling exists between the regions vibrating at frequencies $f_1$ and $f_2$ through the surrounding region of the wafer. In this coupled condition measurements across either pair of electrodes with the other pair short-circuited exhibits two coupled short circuit frequencies $f_A$ and $f_B$ which are separate from each other. These frequencies are also available from measuring the two resonators connected in parallel and cross-connected in parallel. The greater the coupling, the further apart are the frequencies $f_A$ and $f_B$. The coupled resonators, when connected in parallel and cross-connected in parallel, also exhibit two antiresonant or parallel-resonant frequencies $f_{aA}$ and $f_{aB}$, whose separation increases with increasing coupling. In the structure of FIGS. 1 and 2, $(f_B-f_A) < (f_{a1}-f_1)$ and $(f_B-f_A) < (f_{a2}-f_2)$. Preferably, $(f_B-f_A) < \frac{1}{2}(f_{a1}-f_1)$ and $(f_B-f_A) < \frac{1}{2}(f_{a1}-f_1)$. If these conditions are met, the couplings are sufficiently loose so that only one passband between the resonant frequencies $f_B$ and $f_A$ appears across small load resistances $R_L$ such as 10 ohms. If the conditions are not met, the resulting passband becomes distorted or comprises two passbands. A single passband can, however, be obtained by meeting the conditions and making the value of $R_L$ very high. This has the effect of producing the passband between the two antiresonant frequencies $f_{aA}$ and $f_{aB}$ and suppressing the incipient passband between the resonant frequencies $f_A$ and $f_B$. When the low value of $R_L$ is used this higher band is suppressed.

Besides the frequencies $f_1, f_2, f_{a1}, f_{a2}, f_A, f_B, f_{aA}$, and $f_{aB}$, other frequencies are excited in the wafer W. These are inharmonic relative to the beforementioned frequencies. These inharmonic frequencies, or inharmonic frequencies as they are sometimes called, arise from the energy trapping effected by the high piezoelectric coupling between the electrodes and the wafer. The effect, however, is minimized in FIGS. 1 and 2 by plating the electrodes 18, 20, 22, and 24 in their respective recesses 10, 12, 14, and 16. The inharmonic frequency modes are thus effectively suppressed.

Figure 3:
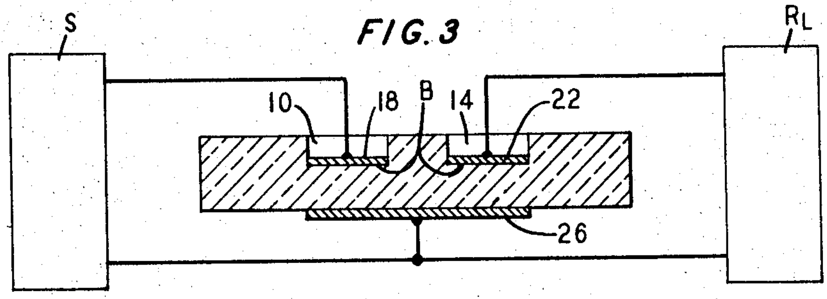
FIG. 3 is a schematic diagram including a sectional view of a filter, illustrating another circuit embodying features of the invention.

FIG. 3 illustrates another circuit embodying features of the invention. Here, like reference characteristics designated like parts. The electrodes 18 and 20 again are vapor deposited in the bases B of respective recesses 10 and 14. However, a single electrode 26 large enough to oppose both electrodes 18 and 22 performs the function of electrodes 20 and 24. FIG. 3 may also be embodied by plating the electrode 26 within a recess large enough to receive it.

Figure 4:
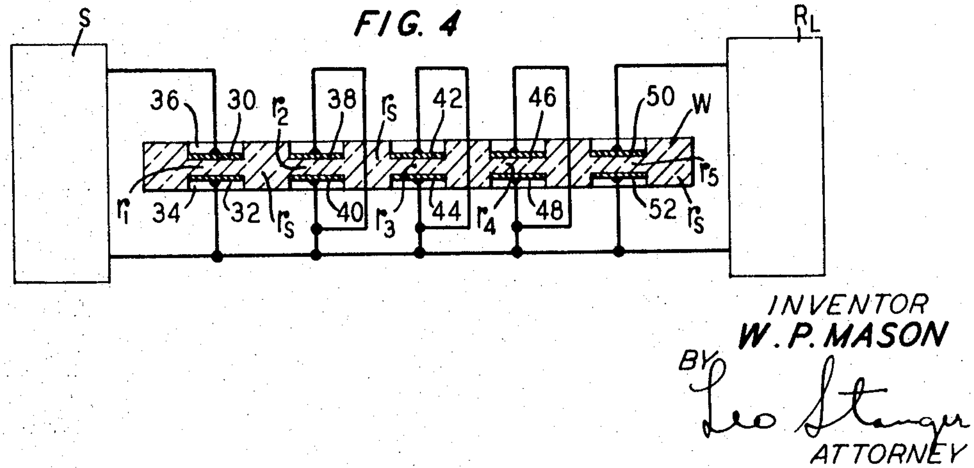
FIG. 4 is a schematic diagram illustrating still another circuit which includes another filter structure and embodies features of the invention.

Still another embodiment of the invention is illustrated in FIG. 4. Here, the source S excites a pair of electrodes 30 and 32 vapor deposited in recesses in opposite faces of the wafer W. The excitement by the source S piezoelectrically generates thickness shear vibrations in the region $r_1$ between the electrodes 30 and 32. Although limited by the surrounding region $r_s$, whose thickness is the thickness of the wafer W, these vibrations affect the region $r_2$ formed by two recesses in the wafer W. The thickness of this second region $r_2$ corresponds to the region $r_1$ and is thinner than the surrounding region $r_s$. A pair of electrodes 38 and 40 deposited in the recesses form, with the wafer W, a second resonator corresponding to the first resonator formed by the electrodes 30 and 32. To prevent the electrostatic capacitive effects of the electrodes 38 and 40 from affecting operation of the resonator, the electrodes 38 and 40 are short-circuited. The wafer forms similar resonators with short-circuited electrodes 42 and 44, 46 and 48, and 50 and 52 as a result of the initial piezoelectric excitation. The electrodes 42 to 52 are vapor deposited on the surface of depressions or recesses in the wafer W that form respective regions $r_3$, $r_4$, and $r_5$, also thinner than the surrounding region $r_2$. Suitable wires or plating connects the electrodes 50 and 52 to the load $R_L$.

Preferably, the regions $r_1$, $r_2$, $r_3$, $r_4$, and $r_5$ are substantially identical. Similarly, the electrodes 30 and 32 and 38 to 52 are identical in thickness. They thus tune the resonators formed in each of the regions to identical frequencies $f_R$ (corresponding to $f_1$ and $f_2$) when each region is decoupled from others. They also form antiresonant frequencies $f_{aR}$ (corresponding to $f_{a1}$ and $f_{a2}$). The electrodes on the wafer W in FIG. 4 trap sufficient energy so that the coupling between any two adjacent resonators, when decoupled from other resonators, exhibit two short circuit or series resonant frequencies $f_A$ and $f_B$ and two antiresonant frequencies. In FIG. 4, $f_B-f_A < (f_{aR}-f_R)$. Preferably, the difference between the resonant frequencies is less than $\frac{1}{2}(f_{aR}-f_R)$.

These conditions correspond to a coupling coefficient K between regions, less than $1/2r$, and preferably less than $1/4r$. The value of $r$ is the capacitance ratio $C_0/C_1$, the ratio between the electrostatic capacitance of one of the resonators and the equivalent motional capacitance of that resonator. K is also less than $1/2r$ and preferably less than $1/4r$ in FIG. 1.

When these conditions are not met for at least the resonators of regions $r_1$ and $r_2$ and the resonators of regions $r_4$ and $r_5$, the resulting passbands become distorted and, in fact, comprise at least two separate bands. If the conditions are met, that is, if the couplings between regions $r_1$ and $r_2$ and regions $r_4$ and $r_5$, and preferably all the regions, are sufficiently loose, a passband exists between the resonant frequencies $f_A$ and $f_B$. Other passbands are suppressed by making the load resistance $R_L$ small, such as 10 ohms.

Figure 5:
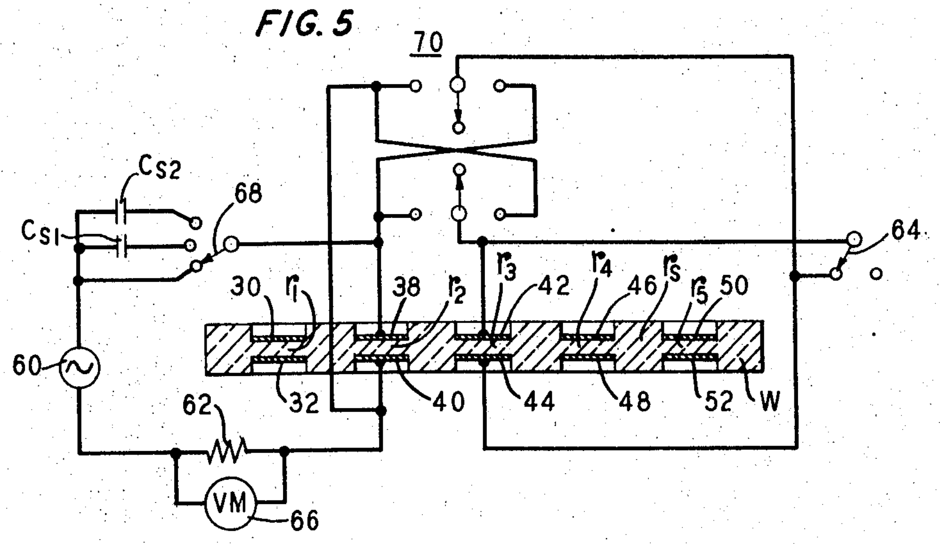
FIG. 5 is a schematic diagram illustrating a testing arrangement for determining characteristics of the circuit in FIG. 4.

The existence of these conditions between any two electrode pairs can be ascertained with the circuit in FIG. 5. This is done by applying a current from a voltage generator 60 through a resistor 62 to one pair of electrodes 38 and 40, and short-circuiting the other electrodes 42 and 44 through a switch 64. This serves to test the conditions existing between the pairs of electrodes 38, 40, and 42, 44 when the resonators which they form with the wafer W are coupled to each other and when the remaining resonators are decoupled. This decoupling of the remaining resonators is accomplished either by leaving the electrodes 30, 32, 46, 48, and 50, 52 unconnected thereby detuning them, or by detuning them even further with respective inductors or capacitors connected across them.

With the energy applied by the generator 60, a meter 66 measures the voltage across the resistor 62 as the frequency of the generator 60 varies. The frequencies at which the voltages are highest are the resonant frequencies $f_A$ and $f_B$ exhibited by the two resonators considered alone. One antiresonant frequency $f_{aA}$ may be determined by noting the frequency at which a minimum voltage occurs across the meter 66 when the generator excites the resonator of electrodes 38 and 40, and 40 and 44 in parallel with each other. This requires maintaining a switch 68 in the position shown and as used for the previous measurements, opening switch 64, and closing a double-pole triple-throw switch 70 to the left. This switch had been at the open center position for the first measurements. The resonant frequency $f_A$ may be checked by noting the frequency at which a maximum occurs. A second antiresonant frequency $f_{aB}$ may be determined similarly by cross-connecting the parallel resonators with the switch 70 connected to the right. The frequency $f_B$ may also be checked at the maximum point.

The coefficient of coupling between resonators can be established from the formula $$K = \frac{f_B - f_A}{f_A} \qquad (1)$$

The circuit of FIG. 5, can also be used to determine the characteristics of the individual resonators. This can be done by switching the armature of switch 64 either to open the circuit across the electrodes 42 and 44 and thereby detuning it from the adjacent resonator or by creating this effect with an inductor. This detunes the frequency of the resonator in the region $r_3$ so that the resonator of region $r_2$ is uncoupled.

The switch 68 is now moved to insert a capacitor $C_{S1}$ and the frequency at which the meter 66 measures maximum is determined. This is the resonant frequency $f_{S1}$. The measurement continues by setting the switch 68 to a capacitor $C_{S2}$ and measuring the frequency $f_{S2}$ at which meter 66 is maximum. This indicates the resonant frequency $f_{S2}$.

$$L_1=\frac{1}{4\pi^2}\left(\frac{1}{f_{S2}^2-f_0^2}-\frac{1}{f_{S1}^2-f_0^2}\right)\frac{1}{C_{S1}-C_{S2}} \quad (2)$$

$$L_1\sim\frac{1}{8\pi^2}\left(\frac{1}{f_{S2}-f_0}-\frac{1}{f_{S1}-f_0}\right)\frac{1}{C_{S1}-C_{S2}} \quad (3)$$

$$C_1=\frac{1}{4\pi^2 f_0^2 L_1} \quad (4)$$

$$f_R=\frac{1}{2\pi}\sqrt{\frac{1}{L_1C_1}},\ f_{aR}=\frac{1}{2\pi}\sqrt{\frac{1}{L_1}\left(\frac{1}{C_1+C_0}\right)} \quad (5)$$

Generally, $f_{aA}-f_A=f1f_B$AHx$f_{aR}-ayf_R$ (6)

Thus, $$\frac{f_B-f_A}{f_A}<\frac{f_{aA}-f_A}{f_A}=\frac{f_{aR}-f_R}{f_R} \quad (7)$$

But the coefficient of coupling between the two resonators $$K=\frac{f_B-f_A}{f_A} \quad (8)$$

Thus, $$K<\frac{f_{aR}-f_R}{f_R} \quad (9)$$

It can also be seen from the publication entitled "Standard Definitions and Methods of Measurement for Piezoelectric Vibrators," IEEE, No. 177, May 1966, published by the Institute of Electrical and Electronics Engineers of New York, N.Y., that $$\frac{f_{aR}-f_R}{f_R}=\frac{C_1}{2C_0}=\frac{1}{2r} \quad (10)$$

Thus, $$K<\frac{1}{2r} \quad (11)$$

Since preferably $$f_B-f_A<\frac{1}{2}(f_{aR}-f_R) \quad (12)$$

then preferably $$K<\frac{C_1}{4C_0}=\frac{1}{4r} \quad (13)$$

Within these limits the couplings may be adjusted between resonators to achieve any particular characteristics. Couplings between two short-circuited resonators need not be within these limits because the short circuits eliminate the effects of $C_0$ that create the limits.

Figure 6:
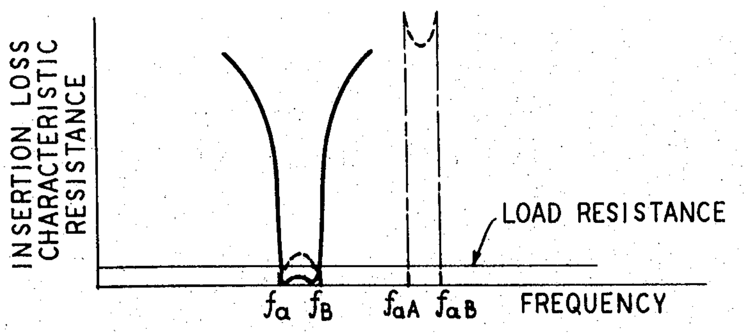
FIG. 6 is a graph illustrating the characteristic resistance available from any two coupled resonators, when they are loosely coupled, and also illustrating the expectable passband when the two coupled resonators pass energy to a low resistive load.

The passband to be expected over two coupled resonators, when one resonator is excited and the other terminated in a resistance, and when these coupling conditions are met, appears in heavy solid line in FIG. 6. This passband arises from matching the load resistance across one of the resonators with one of the two bands of real characteristic impedance, i.e., characteristic resistance, shown in broken line in FIG. 6 and resulting from meeting the above-mentioned resonant and antiresonant frequency relations. If these relations characterized by $K=1/2r$ are not met, the characteristic impedance appears as in broken line in FIG. 7. The resulting passband appears as shown in solid line.

Figure 7:
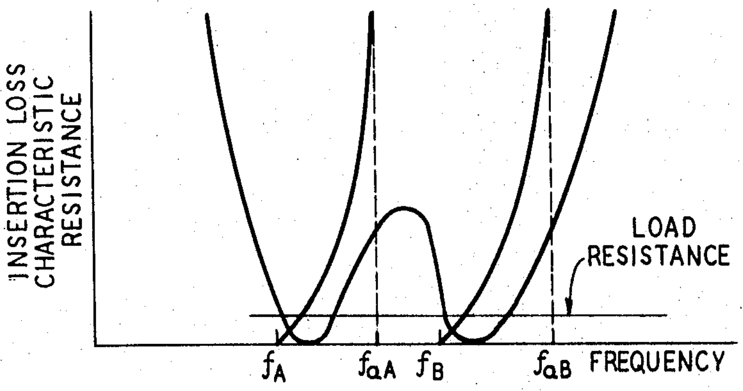
FIG. 7 is a graph illustrating the characteristic resistance formed by two adjacent resonators when they are tightly coupled and also illustrating their resulting passbands.
Figure 8:
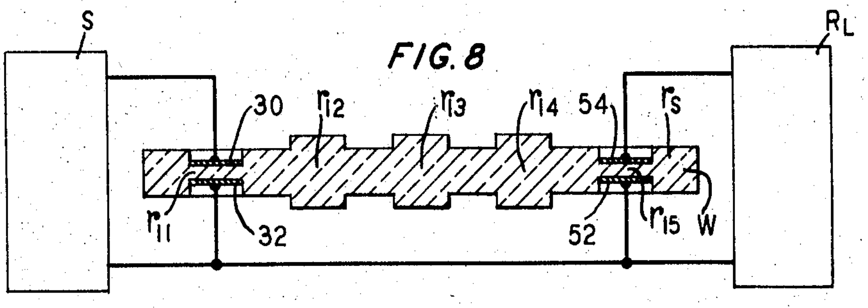
FIG. 8 is a partially schematic, partially sectional diagram illustrating still another circuit embodying features of the invention.

The invention may also be embodied as shown in FIG. 8. Here, the filter F has plated regions $r_{11}$ and $r_{15}$ that correspond to regions $r_1$ and $r_5$ in FIG. 4. However, the regions $r_{12}$, $r_{13}$, and $r_{14}$ are thicker and do not carry electrodes. Their tuning is adjusted to frequencies equal to $f_1$ by their thicknesses. Since such unelectroded resonators do not exhibit any $C_0$ and hence no antiresonant frequencies, the coupling between any two such unplated resonators may be broader than $f_{a1}-f_a$ without distorting the passband as shown in FIG. 7. However, the coupling between regions $r_{11}$ and $r_{12}$ and between $r_{14}$ and $r_{15}$ must be such that $K<1/2$and preferably $K<1/4$. Generally, to achieve a Tchebysheff or Butterworth characteristic all the couplings are preferably such that $K<1/4$.

While embodiments of the invention have been shown in detail, it will be obvious to those skilled in the art that the invention may be otherwise embodied without departing from its spirit and scope.

I claim:

1. A piezoelectric resonator comprising a wafer of piezoelectric material, a first region in said wafer at least partially formed from said wafer material and responsive piezoelectrically to an applied electrical signal to vibrate in a thickness shear mode of vibration, a second region in said wafer surrounding said first region, said second region being thicker than said first region, said first region only supporting electrode means for having applied thereto an electrical signal for acoustically energizing said wafer in a thickness shear mode, a third region also supported by said second region and thinner than said second region, said first region and said third region together with said electrode means forming respective resonant means when said wafer is excited in a thickness shear mode, said second region coupling said respective resonant means.

2. A resonator as in claim 1 wherein said third region supports second electrode means whereby energy applied at said first electrode means may be sensed at said second electrode means.

3. A resonator as in claim 1 further comprising a plurality of additional regions each surrounded by said second region and thinner than said second region, said regions being acoustically coupled to each other through said second region when said wafer is excited in a thickness shear mode.

4. A resonator as in claim 3 wherein said first region and said plurality of additional regions form respective resonator means coupled to at least one of said other resonator means through said second region.

5. A resonator as in claim 4 wherein one of said plurality of regions supports electrode means and wherein energy applied to one of said electrode means may be sensed by the other of said electrode means.

6. A resonator as in claim 5 wherein the remainder of said regions surrounded by said second region each support electrode means and wherein said electrode means each comprise a pair of electrode plates and wherein the plates of the electrode means on the remaining ones of said regions are short-circuited.

7. A resonator as in claim 2 wherein said resonator means when said wafer is excited in a thickness shear mode exhibit two resonant frequencies and at least one antiresonant frequency and wherein said antiresonant frequency is higher than either one of said resonant frequencies.

8. A resonator as in claim 2 wherein said resonant means exhibit when said wafer is excited in the thickness shear mode two resonant frequencies and two antiresonant frequencies and wherein said resonant frequencies are each lower in frequency than each of said antiresonant frequencies.